United States Patent [19]

Kirchner et al.

[11] Patent Number: 4,638,204
[45] Date of Patent: Jan. 20, 1987

[54] HAMMER BRUSH HOLDER ASSEMBLY FOR A COMMUTATOR MOTOR

[75] Inventors: Albert Kirchner, Schweinfurt; Juergen Schoen, Wuerzburg; Ortwin Happ, Rossbrunn, all of Fed. Rep. of Germany

[73] Assignee: Siemens Aktiengesellschaft, Munich, Fed. Rep. of Germany

[21] Appl. No.: 777,909

[22] Filed: Sep. 19, 1985

[30] Foreign Application Priority Data

Sep. 19, 1984 [DE] Fed. Rep. of Germany ....... 3434390

[51] Int. Cl.$^4$ ............................................. H02K 13/00
[52] U.S. Cl. ....................................... 310/239; 310/43; 310/68 R; 310/72; 310/241; 310/242
[58] Field of Search ............... 310/239, 241, 242, 244, 310/245, 246, 247, 51, 43, 89, 68 R, 72, 42, 248

[56] References Cited

U.S. PATENT DOCUMENTS

| 2,334,722 | 11/1943 | Mirick .............................. 310/68 R |
| 4,340,831 | 7/1982 | Kuhlmann ........................ 310/239 |
| 4,342,934 | 8/1982 | van Wijhe ....................... 310/68 R |
| 4,381,468 | 4/1983 | Adam ............................... 310/239 |

FOREIGN PATENT DOCUMENTS

| 0105392 | 4/1984 | European Pat. Off. . |
| 2813956 | 4/1979 | Fed. Rep. of Germany ...... 310/239 |
| 2743359 | 4/1979 | Fed. Rep. of Germany ...... 310/241 |
| 2814009 | 10/1979 | Fed. Rep. of Germany ...... 310/239 |
| 3023803 | 1/1982 | Fed. Rep. of Germany . |
| 0698885 | 2/1931 | France ............................... 310/239 |
| 2328308 | 5/1977 | France . |
| 2341965 | 9/1977 | France . |
| 2490886 | 3/1982 | France . |
| 0023774 | 2/1980 | Japan ................................ 310/239 |
| 0718994 | 11/1954 | United Kingdom ............... 310/239 |

Primary Examiner—R. S. Skudy
Attorney, Agent, or Firm—F. W. Powers; J. L. James

[57] ABSTRACT

A hammer brush holder assembly can be easily fabricated and assembled by robot automation using only a few simple steps. The brush holder has at least two brush support arms swivel-mounted at one end in a brush rocker and pressed against a commutator by a tension spring via the brushes which are held at the other end of the brush rocker. The brush support arms with sleeve-shaped ends can be slipped axially onto lugs molded in an axial fashion to the brush rocker and locked in place. Both brush support arms are connected as parts of a single-piece plastic injection-molded component with an integral breakaway bridge segment which holds both brush support arms to a preselected mutual spacing. The breakaway bridge segment can be eliminated after installation of the hammer brush support assembly in the commutator motor.

12 Claims, 10 Drawing Figures

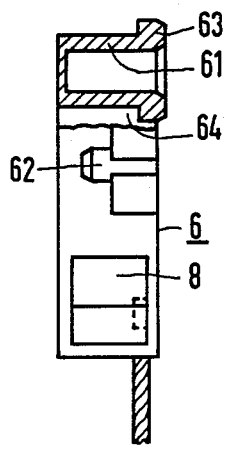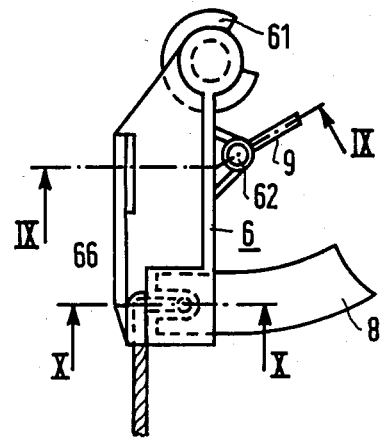
FIG 7          FIG 6
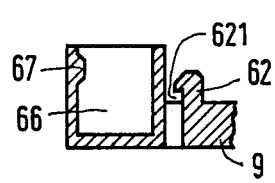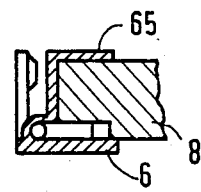
FIG 9          FIG 10
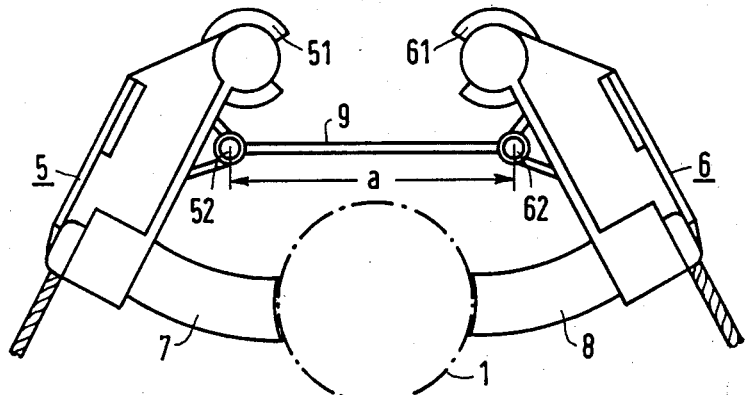
FIG 8

HAMMER BRUSH HOLDER ASSEMBLY FOR A COMMUTATOR MOTOR

BACKGROUND OF THE INVENTION

This invention pertains to a hammer brush holder assembly for a commutator motor which is suited for automated assembly.

A hammer brush holder assembly is disclosed in German Offenlegungsschrift No. 3,023,803 wherein the brush support arms with their open bearing shells molded onto one end are suspended at their free end axially in mounting rails. The mounting rails are molded onto a brush support plate and pressed against the commutator by a pressure spring suspended or tension-mounted between the hammer brush supports via brushes inserted at their other end in injection-molded pockets. For axial position fixation, a specially formed end plate is mounted in a self-locking fashion onto the free end of the mounting rail which has been previously equipped with the suspended brush support arms. The brush support plate with the molded-on mounting rails for the swivelling bearing mount of the brush support arms can slide frontally into an axial housing opening by means of the cast alignment edge slots. The brush support plate is designed as a single-component plastic molding made of molding dies which can only be opened in the axial direction and similarly only assembled in an axial direction. It is desirable to assemble the brush hammer holder in an efficient manner using a minimal number of operating steps and in a sequence to facilitate automated production.

Accordingly, it is an object of the present invention to provide a hammer brush holder which can be assembled in a fully automated production line.

Another object of the invention is to reduce the number of operating steps required for assembly of the hammer brush holders.

SUMMARY OF THE INVENTION

Briefly stated, in accordance with one aspect of the invention, a hammer brush holder is provided for a commutator motor having a commutator and a housing. The brush holder includes a brush, a brush rocker defining a lug and a brush rocker having an axial end and a free end and which is fastened to the housing. A mounting pin is molded in one piece on the axial end of the brush rocker in the interior of the housing and molded in one piece on the brush bridge lug. A brush support arm is mounted on the free end of the brush rocker with its free end facing away from the brush pivotally mounted and held in an axially fixed position. The free end of the brush support arm faces away from the brush and encompasses the lug with a sleeve-shaped end. The sleeve-shaped end can slide onto the lug from the free end up to an axial positioning groove connection with the brush rocker.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

FIG. 6 is a side elevation of a single brush support arm;

FIG. 7 is a longitudinal section through the brush support arm shown in FIG. 6.

FIG. 8 illustrates two brush support arms of a hammer brush-support holder assembly held in their mutual position by a bridge segment with integrally molded brushes;

FIG. 9 is a cross-section of an individual brush support arm taken along line IX—IX of FIG. 6; and FIG. 10 is a cross-section of an individual brush support arm taken along line X—X of FIG. 6.

DESCRIPTION OF A PREFERRED EMBODIMENT

Figure 1:
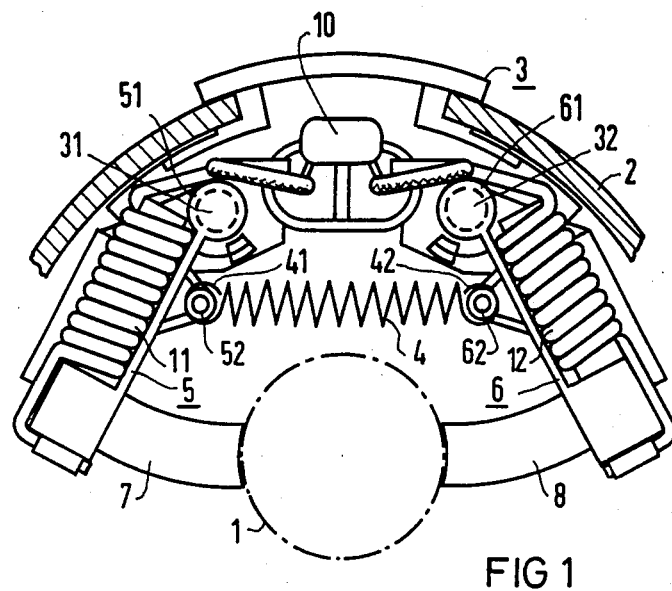
FIG. 1 is a frontal plan view of a hammer brush holder system inserted into an axial housing opening.
Figure 3:
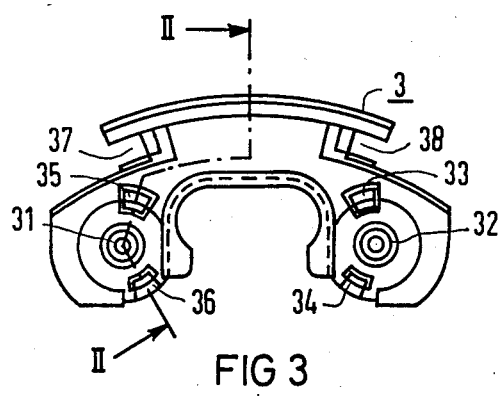
FIG. 3 is a frontal plan view of the brush rocker of FIG. 1 prior to being fully equipped.
Figure 4:
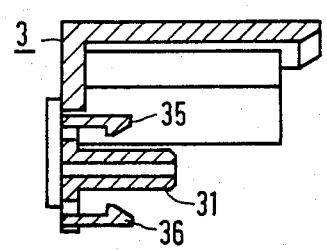
FIG. 4 is an axial longitudinal section through the brush rocker in accordance with FIG. 2.
Figure 5:
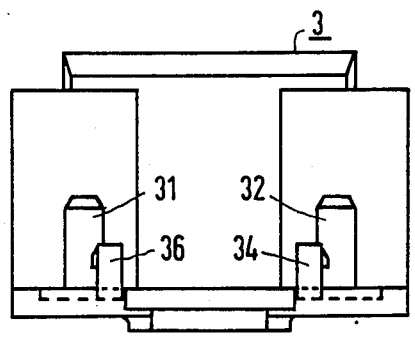
FIG. 5 is a motor-side radial plan view on the brush rocker in accordance with FIG. 3.

Referring to the drawings, FIG. 1 indicates, in a partial sectional view, a motor housing 2 of an enclosed commutator motor. A brush rocker 3 is slid into a frontal axial opening of the motor housing 2. The brush rocker 3 is shown in section and has a thinner radial wall thickness than the radial thickness of motor housing 2. The brush rocker 3 slides in from the front side and is held in place by the bearing bracket which is placed up against it after insertion. To align and simultaneously seal the axial opening of motor housing 2, the brush rocker 3 overlaps, along its circumference, the axial opening both on the exterior as well as interior side of motor housing 2 by its edge slots 37, 38 as shown in FIG. 3.

Figure 2:
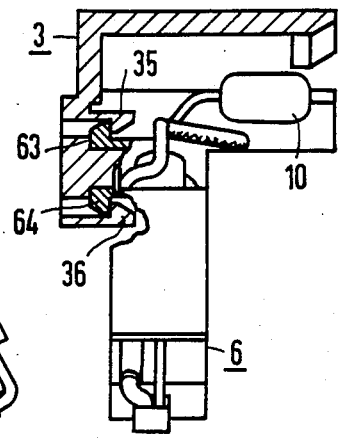
FIG. 2 is an axial longitudinal section through the hammer brush holder system in FIG. 1 along line II—II of FIG. 3.

Along the rear wall of brush rocker 3, axially aligned, cylindrically shaped lugs 31, 32 are molded on. The brush support arms 5, 6 with sleeve-shaped ends 51, 61 are slid onto the lugs 31, 32 until they lock with the molded projections 63, 64 behind corresponding groove locks 33, 34 and 35, 36 respectively, which are molded onto the brush rocker 3 thereby axially fastening the brush support arms 5, 6 which are swivel-mounted to lugs 31, 32. As can be seen, particularly from FIG. 1 and FIG. 2, a capacitor 10 and a noise suppressor 11 or 12 are each attached to both brush support arms 5, 6 in the brush rocker 3 and connected as a noise-suppressing means. Brush support arms 5, 6 in the region where the noise suppressors are attached include pocket-shaped cutouts 66 into which the noise suppressors can be inserted from their axially open sides and clamped in place by a retaining lock 67 as shown in FIGS. 6 and 9.

Both brush support arms 5, 6 and their respective brushes 7, 8 are pressed by a tension spring 4 against the commutator shown in phantom lines in FIG. 1 and FIG. 8.

For simple installation of the pressure spring 4, axially aligned, cylindrically-shaped lugs 52, 62 are molded on the brush support arms 5, 6 onto whose free ends pressure spring 4 with its eyelet-shaped ends 41, 42 can be slipped on in an axial direction, in the same manner as the other components to be assembled, until the eyelet-shaped ends 41, 42 lock in place behind a groove lock 621 (shown in FIG. 9 for brush support arm 6). The brushes 7, 8 are held in place by the brush support arms 5, 6 which may be injection-molded as an integral component with the injection-molding of the brush support arms 5, 6 so that any additional insertion of the brushes in a previously injection-molded pocket is eliminated. This saves a separate fabrication or assembly step. Brush support arm 6 has a brush 8, which as shown in FIG. 10, is enclosed on three sides by an injection-molded wall 65.

Referring to FIG. 8, the brush support arm 5, 6 of a hammer brush holder assembly with injection-molded brushes 7, 8 are preferably fabricated as a single-unit plastic injection molding. The plastic injection molding has a break away bridge segment 9 which is advantageously molded in one unit so that, between the pins 52, 62 of the brush support arms 5, 6 which are designed to mount the tension spring 4 and define a space "a", the brushes 7, 8 are held in place at a preselected distance which permits the passage of the commutator 1 between their commutator-side contact surfaces. Following the insertion which can be automated of the noise suppressors 11, 12, and positioning of the brush support arms and a connecting line by ultrasonic welding, for example, the electrical connections are made at the brush support arms 5, 6 with the injection-molded brushes 7, 8 held in place by the breakaway bridge segment 9. Tension spring 4 is then slipped onto pins 52, 62 until attaining its self-locking groove position. The pre-assembled component with the two brush support arms 5, 6 connected by breakaway bridge segment 9 is slid onto the rotating points of the brush rocker 3 which are designed as axially aligned cylindrical shaped lugs 31, 32, along with the sleeve-shaped ends 51, 61 of the brush support arms 5, 6 until their groove connection snaps in place. This locks the brush support arms 5, 6 in place to prevent any axial motion along the lugs 31, 32. Following complete assembly of the brush rocker 3, the bridge segment 9 is broken away from the brush rocker and all connected components, and, if necessary, before any seating procedure is performed on the complete brush assembly so that the brushes 7, 8 are now released to contact commutator 1.

It will now be understood that the hammer brush assembly permits a clearly stationary assembly of the brush support arms onto the brush rocker or bridge in a one-step operation in the axial direction. A further simplification is made possible, while simultaneously mounting both brush support arms, installing the brush rocker fitted with both brush support arms into the housing and installing the motor rotor, by having both brush support arms become part of a single-unit casting. The casting is preferably a plastic injection molding with an integral breakaway bridge segment which holds both brush support arms at a specified distance from each other. It is advantageous in this procedure for both brush support arms to be held by the breakaway bridge segment at such a mutual spacing that both brush support arms with their eyelet-shaped ends can be simultaneously axially slipped on the shaft ends. In this manner the commutator of the rotor of the commutator motor can be freely inserted axially between their brush-fitted ends on the brush side. After total assembly of the motor, and, if need be, before seating the installed brush system, the bridge segment between the brush support arms is simply stripped off thereby releasing the brushes to contact the commutator. Because of the preset mutual position of both brush support arms defined during the injection molding cycle, further assembly with additional components is substantially simplified. Such additional components include noise suppressors and their circuit interconnection and connections to the brushes of both brush support arms and to an external connecting plug.

The number of assembly steps to be performed by robots can be reduced by having the brushes injection-molded jointly in pockets on the brush-side end of the brush support arms and thus be supplied as an integral component of the brush holder so that they can be installed as one component. Axially running pins with axially free ends are molded as a single unit onto the brush support arms for easy assembly of the ends of the tension spring to be fastened to the brush support arms. The tension spring with eyelet-shaped ends can be slipped onto the brush support arms and then be held in a self-locking position. For a preferred, so-called unit assembly, the brush support plates, with molded-on lugs and grooves for axial fixation of the assembled brush support arms or the brush support arms themselves with molded-on pockets for insertion of the noise suppressors and with the interspatial breakaway bridge segments, are designed as a component. This component can be released from the casting mold only in an axial direction and can be assembled as a component only in an axial direction.

As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and script of the invention.

We claim:

1. A hammer brush holder for a commutator motor having a brush rocker, fastened to a housing of the commutator motor, with axially extending mounting means integrally molded on said brush rocker at one axial end, and a brush support arm swivel-mounted in a fixed axial position onto another end of each respective mounting means, the improvement comprising:
    a brush fastened to each brush support arm respectively, and located at an end of said brush support arm opposite said swivel mounting;
    each mounting means defining a lug respectively; and
    a mounting means molded in one piece on the axial ends of the brush rocker in the interior of the housing, said means being molded in one piece on the brush lug; and
    each brush support arm having a sleeve-shaped end means for swivel-mounting on and encompassing said respective lug, integrally molded thereon, whereby the sleeve-shaped end means slides onto the lug up to an axially positioning groove connection with the brush rocker.

2. A hammer brush holder in accordance with claim 1 including a second brush support arm pivotally mounted, said brush support arms being mateable with the opposite sides of the commutator with their brush-side ends via their brushes, said brush support arms forming parts of a single-component molding with an integral breakaway bridge segment which holds both brush support arms at a preselected mutual spacing.

3. A hammer brush holder in accordance with claim 2, including a second lug and wherein both brush support arms are held in place by the bridge segment at such a specific spacing that both brush support arms with their eyelet-shaped ends can simultaneously slip onto the lugs enabling the commutator of the rotor of the commutator motor to be inserted with axial free play between their brush-side ends equipped with the brushes.

4. A hammer brush holder system in accordance with claim 2 including a tension spring positioned between the brush support arms connected by the integral breakaway bridge segment to create operational brush pressure against the commutator of the brush-fitted ends of the brush support arms.

5. A hammer brush holder in accordance with claim 4, including axially extending pins with axially free ends molded onto the brush support arms onto which the tension spring with eyelet-shaped ends can slip.

6. A hammer brush in accordance with claim 5, wherein the integral breakaway bridge segment is positioned between the axially extending pins.

7. A hammer brush holder in accordance with claim 2 wherein the brushes are injection-molded along with brush-side ends of the brush support arms.

8. A hammer brush holder in accordance with claim 2 including pockets molded into the brush support arms which can be fitted in an axial direction to hold a noise suppressor.

9. A hammer brush holder in accordance with claim 1 wherein the brush rocker with the molded lug and groove-locking mechanism for axial fixation of an assembled brush support arm can be released from the mold only in an axial direction and can be fitted as a component only in an axial direction.

10. A hammer brush holder in accordance with claim 2 wherein pockets molded into the brush support arms which can be fitted in an axial direction to hold a capacitor.

11. A hammer brush holder in accordance with claim 1 wherein the brush rocker with a molded lug and groove-locking mechanism for axial fixation of the brush support arm with its molded-on pockets and pins can be released from the mold only in an axial direction and can be fitted as a component only in an axial direction.

12. A hammer brush holder in accordance with claim 1 wherein the brush rocker with a molded lug and groove-locking mechanism for axial fixation of the brush support arm with its temporary bridge segments can be released only from the mold and only in an axial direction and can be fitted as a component only in an axial direction.

* * * * *